US012599945B2

(12) United States Patent
Meng et al.

(10) Patent No.: US 12,599,945 B2
(45) Date of Patent: Apr. 14, 2026

(54) PLATINUM CATALYST RECYCLING DEVICE WITH MULTIPLE FILTRATION STRUCTURES

(71) Applicant: Yulin University, Yulin (CN)

(72) Inventors: Yu Meng, Yulin (CN); Liang Ma, Yulin (CN); Linbin Ying, Yulin (CN); Xiaoyan Liu, Yulin (CN); Yajun Ma, Yulin (CN)

(73) Assignee: Yulin University, Yulin (CN)

( * ) Notice: Subject to any disclaimer, the term of this patent is extended or adjusted under 35 U.S.C. 154(b) by 345 days.

(21) Appl. No.: 18/410,919

(22) Filed: Jan. 11, 2024

(65) Prior Publication Data

US 2025/0099929 A1     Mar. 27, 2025

(30) Foreign Application Priority Data

Sep. 25, 2023    (CN) .......................... 202311243916.5

(51) Int. Cl.
| | |
|---|---|
| *B09B 3/35* | (2022.01) |
| *B01F 21/10* | (2022.01) |
| *B01F 27/70* | (2022.01) |
| *B01F 33/83* | (2022.01) |
| *B02C 23/10* | (2006.01) |
| *B02C 23/14* | (2006.01) |
| *B09B 101/95* | (2022.01) |
| *C22B 11/02* | (2006.01) |
| *B09B 101/05* | (2022.01) |

(52) U.S. Cl.
CPC ................ *B09B 3/35* (2022.01); *B01F 21/10* (2022.01); *B01F 27/70* (2022.01); *B02C 23/10* (2013.01); *B02C 23/14* (2013.01); *C22B*

*11/026* (2013.01); *B01F 33/831* (2022.01); *B09B 2101/05* (2022.01); *B09B 2101/95* (2022.01); *Y02P 10/20* (2015.11); *Y02W 30/52* (2015.05)

(58) Field of Classification Search
CPC ... B09B 2101/05; B09B 2101/95; B09B 3/35; Y02W 30/50; Y02W 30/52; B02C 23/10; B02C 23/14; Y02P 10/20; C22B 11/026; B01F 21/10; B01F 27/70; B01F 27/701
See application file for complete search history.

(56) References Cited

FOREIGN PATENT DOCUMENTS

| | | | | | |
|---|---|---|---|---|---|
| CN | 112372896 A | * | 2/2021 | ............. | B29B 17/04 |
| CN | 212640200 U | * | 3/2021 | | |
| CN | 112605113 A | * | 4/2021 | ............ | B01F 33/831 |

(Continued)

*Primary Examiner* — Jared O Brown
(74) *Attorney, Agent, or Firm* — Hemisphere Law, PLLC

(57) ABSTRACT

A platinum catalyst recycling device with multiple filtration structures is provided. The device includes a support base, a recycling housing, and a crushing housing. A top of the support base is fixedly connected to the recycling housing, a top surface of the recycling housing is fixedly connected to the crushing housing, and a feed port is provided on a top surface of the crushing housing. A feed tube is installed at the feed port of the crushing housing, and a crushing roller assembly is installed in an inner cavity of the crushing housing. The crushing roller assembly is disposed in an inner cavity of a crushing chamber, and the crushing chamber is fixedly connected to a sidewall of the inner cavity of the crushing housing. A bottom of the crushing chamber is fixedly connected to a guide plate. Uniform plates are disposed below the guide plate.

10 Claims, 6 Drawing Sheets

(56) References Cited

FOREIGN PATENT DOCUMENTS

| CN | 112899478 A | * | 6/2021 | ........... C22B 11/048 |
|----|-------------|---|--------|------------------------|
| CN | 113681668 A | * | 11/2021 | .............. B27L 11/06 |
| CN | 114480851 A | * | 5/2022 | ........... C22B 11/048 |
| CN | 114832893 A | * | 8/2022 | ............. B02C 23/08 |
| CN | 114959275 A | * | 8/2022 | ........... C22B 11/048 |
| CN | 115155722 A | * | 10/2022 | .............. B02C 4/28 |
| CN | 115254906 A | * | 11/2022 | .............. B09B 3/35 |
| CN | 218795964 U | * | 4/2023 | |
| CN | 218811984 U | * | 4/2023 | |
| CN | 116083725 A | * | 5/2023 | ............. C22B 7/006 |
| CN | 116219173 A | * | 6/2023 | ............. C22B 7/001 |
| CN | 116510857 A | * | 8/2023 | ........... B02C 18/142 |
| CN | 116970806 A | * | 10/2023 | .............. C22B 3/02 |
| CN | 117101769 A | * | 11/2023 | .............. B02C 4/08 |

* cited by examiner

PLATINUM CATALYST RECYCLING DEVICE WITH MULTIPLE FILTRATION STRUCTURES

TECHNICAL FIELD

The disclosure relates to a platinum catalyst recycling device, and particularly to a platinum catalyst recycling device with multiple filtration structures.

BACKGROUND

A platinum catalyst, as a kind of catalyst, is a general term for catalysts made mainly of platinum metal as an active component. The platinum catalyst adopts platinum metal meshes, platinum black, or loads platinum on a carrier such as an alumina oxide carrier, and the platinum catalyst may contain a co-catalyst such as rhenium. It is mainly used for processes such as ammonia oxidation, petroleum hydrocarbon reforming, unsaturated compound oxidation and hydrogenation, and removal of carbon monoxide and nitrogen oxides from gases, and is the commonly used catalyst in chemical, petroleum, and chemical reaction processes. The platinum catalyst has the advantages of high catalytic activity, strong selectivity, convenient production, and low usage, and its catalytic performance can be optimized by changing and improving manufacturing methods and compounding with other metals or co-catalyst active components. The platinum catalyst has a wide range of application areas, can be repeatedly regenerated and activated for use, and has a long service life; and the platinum metal of the waste catalyst can be recycled and reused.

To reduce the production cost of platinum catalysts and reduce environmental pollution, it is generally necessary to recycle waste platinum catalysts, precious metal platinum is extracted from the recycled waste platinum catalysts and then used to prepare catalysts or other products, which has certain economic benefits.

In Chinese patent with a publication number of CN218795964U and a title of "a platinum catalyst recycling device", a stirring shaft is driven by an electric motor, and stirring blades fully stir and mix a feed liquid in an axial direction of a dissolution tank, so as to improve the mixing efficiency of the feed liquid. During the rotation of the stirring shaft, a grinding shaft is driven by a belt pulley and a belt to rotate simultaneously, and the grinding shaft drives grinding blades to rotate, thereby cutting and crushing the large platinum catalyst waste entering from a feed port, which facilitates stirring and mixing the crushed platinum catalyst waste with a mixed acid solution in a subsequent process.

However, the above-mentioned patent simply sets up crushing blades to crush large pieces of platinum catalyst waste. Since the device lacks a filtering structure for the crushed platinum catalyst waste, the crushed platinum catalyst waste with large size difference enters a platinum recycling solution for platinum extraction at the same time. Solubilities of the crushed platinum catalyst waste with different sizes are different, and therefore the efficiency of platinum extraction is reduced in a single platinum extraction. At the same time, in the above-mentioned patent, the stirring blades are used to stir and mix the feed liquid in the axial direction of the dissolution tank, the stirring direction is single and there is a large stirring dead angle. Additionally, the platinum catalyst waste is prone to precipitation and accumulation, resulting in a smaller contact area between the platinum catalyst waste and the platinum recycling solution, which affects the dissolution efficiency of the platinum catalyst waste and reduces the extraction efficiency of the precious metal platinum.

SUMMARY

In order to solve the shortcomings in the prior art, a filter plate can be configured to filter crushed platinum catalyst waste, so that pieces of the crushed platinum catalyst waste dissolved and recycled in a recycling housing have a similar size, which solves the problem of different solubilities caused by the pieces of the crushed platinum catalyst waste with a large difference in size entering the platinum recycling solution at the same time, and therefore time for extracting platinum is the same in each platinum extraction process. In addition, during filtration, uniform plates can be configured to sequentially and uniformly drop the crushed platinum catalyst waste onto the filter plate, so as to prevent the accumulation of the crushed platinum catalyst waste and improve the filtration efficiency. At the same time, an anti-blocking push plate is configured to push the crushed platinum catalyst waste with large sizes to two sides for collection, so as to avoid blocking the filter plate and affecting filtration efficiency.

In order to further solve the problems in the prior art, a rotation motor is configured to drive the rotation of a filter housing. A center gear and side gears are configured to drive flipping assemblies to rotate, and the center gear and the side gears are rotated in reverse directions. At this time, a transmission belt can be configured to drive flipping plates to move, which can allow the crushed platinum catalyst waste to move from bottom to top, so as to solve the problem of low dissolution efficiency caused by a single stirring direction. The flipping plates can fully make the crushed platinum catalyst waste contact with the platinum recycling solution, so as to improve the extraction efficiency of platinum. At the same time, the rotation motor is configured to drive the stirring blades to rotate, which can prevent the accumulation of the crushed platinum catalyst waste at a bottom of the recycling housing and improve the dissolution efficiency of platinum catalyst waste.

In order to further solve the problems in the prior art, a driving mechanism is configured to provide a driving force for the rotation of uniform shafts and the rotation of a threaded column at the same time. A linkage mechanism is configured to provide a driving force for the rotation of the filter housing and the rotation of stirring shafts at the same time, so as to reduce the number of power sources, reduce the operating cost of the recycling device, and reduce energy consumption, which is more environmentally friendly.

A platinum catalyst recycling device with multiple filtration structures is provided. The platinum catalyst recycling device includes:

a support base,
a recycling housing, fixedly connected to a top of the support base;
a crushing housing, fixedly connected to a top surface of the recycling housing; a feed port is defined on a top surface of the crushing housing;
a feed tube, installed at the feed port of the crushing housing;
a crushing roller assembly, installed in an inner cavity of the crushing housing;
a crushing chamber, fixedly connected to a sidewall of the inner cavity of the crushing housing; the crushing roller assembly is disposed in an inner cavity of the crushing chamber;

a guide plate, fixedly connected to a bottom of the crushing chamber;

uniform plates, disposed below the guide plate;

a dispersion assembly, connected to the uniform plates;

a filter plate, disposed below the uniform plates;

an anti-blocking push plate, disposed on the filter plate;

an anti-blocking assembly, connected to the anti-blocking push plate; and a driving mechanism, connected between the dispersion assembly and the anti-blocking assembly through.

In an embodiment, the dispersion assembly includes: a dispersion plate and two uniform shafts; the dispersion plate is fixedly connected to the sidewall of the inner cavity of the crushing housing; the two uniform shafts are symmetrically distributed, and disposed above the dispersion plate; and surfaces of the two uniform shafts are fixedly connected to the uniform plates, and the uniform plates connected to each of the two uniform shafts are distributed in a circular array.

In an embodiment, the anti-blocking assembly includes: a threaded column, a slide plate and two limit columns; an end of the threaded column is rotatably connected to the sidewall of the inner cavity of the crushing housing; the two limit columns are symmetrically distributed relative to the threaded column, and the two limit columns are fixedly connected to the sidewall of the inner cavity of the crushing housing; the slide plate is threaded with the threaded column, and the slide plate is slidably connected to surfaces of the limit columns; and a bottom of the threaded column is fixedly connected to a top of the anti-blocking push plate.

In an embodiment, the platinum catalyst recycling device further includes: an installation housing fixedly connected to an outside of the crushing housing; the driving mechanism includes: a driving motor and three rotation gears. The driving motor is fixedly connected to a sidewall of an inner cavity of the installation housing, and the three rotation gears are distributed in a triangle and disposed in the inner cavity of the installation housing; adjacent two of the three rotation gears are meshed, and one of the three rotation gears is fixedly connected to an output end of the driving motor; a side of one of the three rotation gears is fixedly connected to the threaded column while other two of the three rotation gears are symmetrically distributed, and the rotation gear fixedly connected to the threaded column is located below the other two rotation gears; and sides of the other two rotation gears are fixedly connected to ends of the uniform shafts, respectively.

In an embodiment, each of the feed tube and the guide plate has a V-shaped structure; a lower end of the feed tube extends to the inner cavity of the crushing chamber through the feed port; and a communication port is opened at a contact position between the recycling housing and the crushing housing, and the communication port is configured to connect the recycling housing and the crushing housing.

In an embodiment, the platinum catalyst recycling device further includes a filter assembly; the filter assembly includes a filter assembly, a support assembly, a linkage mechanism and flipping assemblies. The filter assembly includes: a filter housing, stirring shafts, multiple of stirring blades, a center gear, a rotation motor, and side gears; the filter housing is disposed in an inner cavity of the recycling housing, and the filter housing is connected to an inner wall of the recycling housing through the support assembly; the stirring shafts are disposed below the filter housing, and surfaces of the stirring shafts are fixedly connected with the multiple stirring blades; the filter housing is connected to the multiple stirring blades through the linkage mechanism; the center gear is disposed in an inner cavity of the filter housing, and the center gear is fixedly connected to an output end of the rotation motor; a side of the center gear is meshed with the side gears, and the flipping assemblies are disposed on the center gear and the side gears respectively.

In an embodiment, the support assembly includes: a support frame, anti-deviation housings and a circular rail; a bottom of the inner cavity of the recycling housing is fixedly connected to the support frame; a section of the support frame is inverted-U-shaped; a top surface of the support frame and a top of the inner cavity of the recycling housing are fixedly connected to the anti-deviation housings distributed in a circular array; an inner wall of each of the anti-deviation housings is slidably connected to the circular rail, and the circular rail is fixedly connected to an outside of the recycling housing.

In an embodiment, each of the flipping assemblies includes: two transmission shafts, a transmission belt and fixing plates; the transmission belt is wrapped on the two transmission shafts, and the two transmission shafts are connected through the transmission belt; an end surface of one of the two transmission shafts is fixedly connected to a transmission motor, and two ends of each of the two transmission shafts are respectively provided with two of the fixing plates; a top of the center gear is fixedly connected to two symmetrically distributed fixing plates of the fixing plates; and a top of each of the side gears are fixed connected to two symmetrically distributed fixing plates of the fixing plates.

In an embodiment, the linkage mechanism includes: a linkage motor, an installation shaft, driving gears, driven gears, a first bevel gear, a second bevel gear, transmission chain wheels and transmission chains; the linkage motor is fixed connected to a top of the recycling housing, and an output end of the linkage motor is fixedly connected to the installation shaft; a surface of the installation shaft is fixedly connected to the driving gears; sides of the driving gears are meshed with the driven gears respectively, and the driven gears are fixedly connected to an outside of the filter housing; the inner cavity of the recycling housing is provided with the stirring shafts, the stirring shafts are rotatably connected to the inner wall of the recycling housing, and an end of a middle one of the stirring shafts is fixedly connected to the first bevel gear; a side of the first bevel gear is meshed with the second bevel gear, and the second bevel gear is fixedly connected to the middle one of the stirring shafts; an end of each of the stirring shafts is fixedly connected to a corresponding one of the transmission chain wheels; and adjacent two of the transmission chain wheels are connected through a corresponding one of the transmission chains.

In an embodiment, the platinum catalyst recycling device further includes: a protective housing and rotation shafts; the rotation motor is disposed in an inner cavity of the protective housing, the protective housing is fixedly connected to a bottom of the inner cavity of the filter housing, a top surface of the protective housing is defined on a rotation hole, and an output end of the rotation motor penetrates through the rotation hole and extends to the inner cavity of the filter housing; the side of the center gear is meshed with the side gears distributed in a circular array, bottoms of the side gears are fixedly connected to the rotation shafts, respectively; and ends of the rotation shafts are rotatably connected to the bottom of the inner cavity of the filter housing.

The disclosure has the following beneficial effects.

1. The device of the disclosure has a compact structure. The filter plate can be configured to filter crushed platinum catalyst waste, so that pieces of the crushed platinum catalyst waste dissolved and recycled in a recycling housing have a similar size, which solves the problem of different solubilities caused by the pieces of the crushed platinum catalyst waste with a large difference in size entering the platinum recycling solution at the same time, and therefore time for extracting platinum is the same in each platinum extraction process. In addition, during filtration, the uniform plates can be configured to sequentially and uniformly drop the crushed platinum catalyst waste onto the filter plate, so as to prevent the accumulation of the crushed platinum catalyst waste and improve the filtration efficiency. At the same time, an anti-blocking push plate is configured to push the crushed platinum catalyst waste with large sizes to two sides for collection, so as to avoid blocking the filter plate and affecting filtration efficiency.

2. The device of the disclosure has a reasonable structure. The rotation motor is configured to drive the rotation of a filter housing. A center gear and side gears are configured to drive flipping assemblies to rotate, and the center gear and the side gears are rotated in reverse directions. At this time, a transmission belt can be configured to drive flipping plates to move, which can allow the crushed platinum catalyst waste to move from bottom to top, so as to solve the problem of low dissolution efficiency caused by a single stirring direction. The flipping plates can fully make the crushed platinum catalyst waste contact with the platinum recycling solution, so as to improve the extraction efficiency of platinum. At the same time, the rotation motor is configured to drive the stirring blades to rotate, which can prevent the accumulation of the crushed platinum catalyst waste at a bottom of the recycling housing and improve the dissolution efficiency of platinum catalyst waste.

3. The device of the disclosure has low energy consumption. The driving mechanism is configured to provide a driving force for the rotation of uniform shafts and the rotation of a threaded column at the same time. The linkage mechanism is configured to provide a driving force for the rotation of the filter housing and the rotation of stirring shafts at the same time, so as to reduce the number of power sources, reduce the operating cost of the recycling device, and reduce energy consumption, which is more environmentally friendly.

BRIEF DESCRIPTION OF DRAWINGS

In order to more clearly illustrate embodiments of the disclosure or the technical solutions in the prior art, drawings required in the description of the embodiments or the prior art will be briefly introduced below. Apparently, the drawings in the following description are only some embodiments of the disclosure. For those of ordinary skill in the art, other drawings may also be obtained from these drawings.

Figure 1:
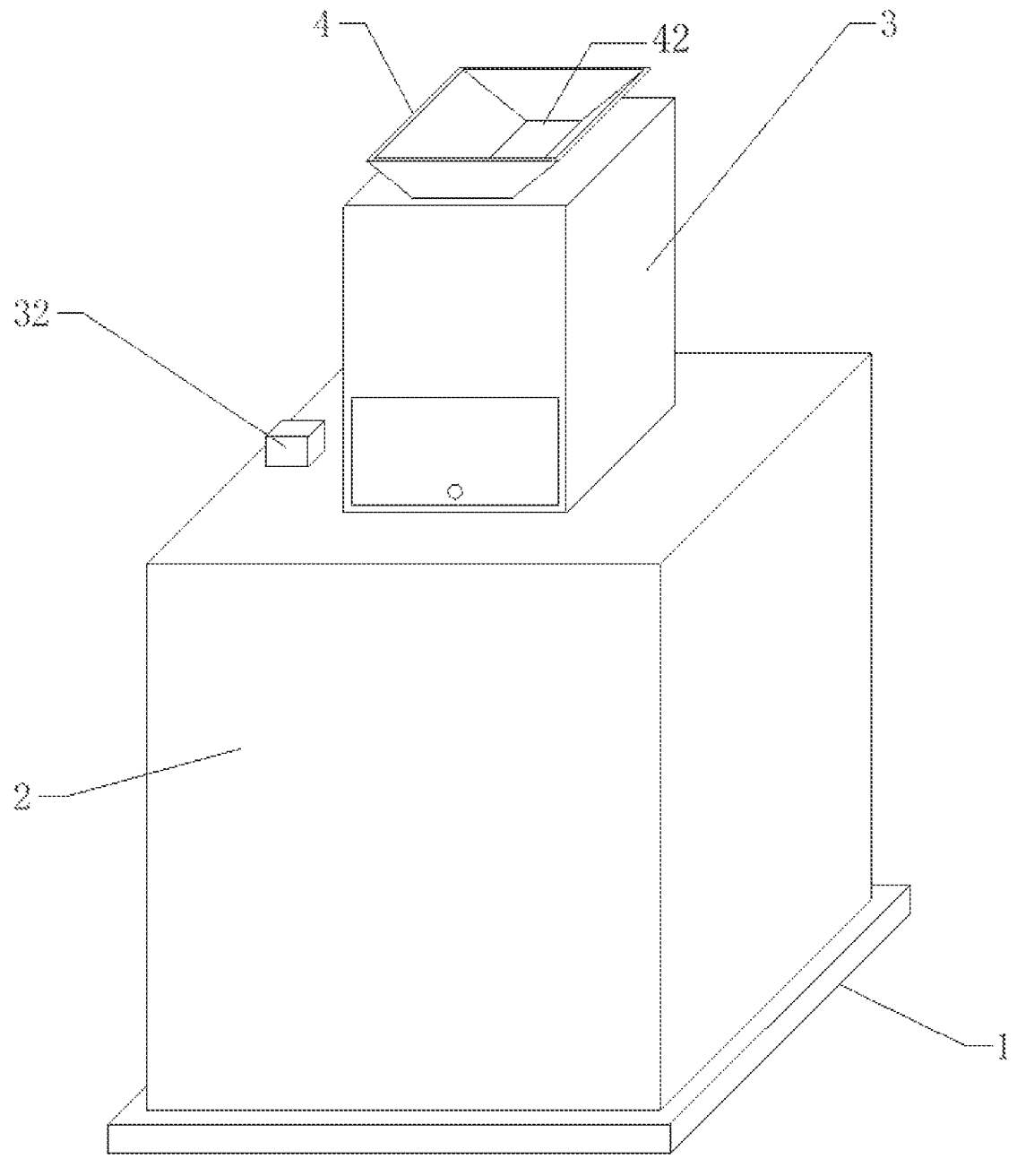
FIG. 1 illustrates a structural schematic diagram of a platinum catalyst recycling device with multiple filtration structures according to an embodiment of the disclosure.

6 blocking push plate of the platinum catalyst recycling device shown in FIG. 1 according to the embodiment of the disclosure.

Figure 5:
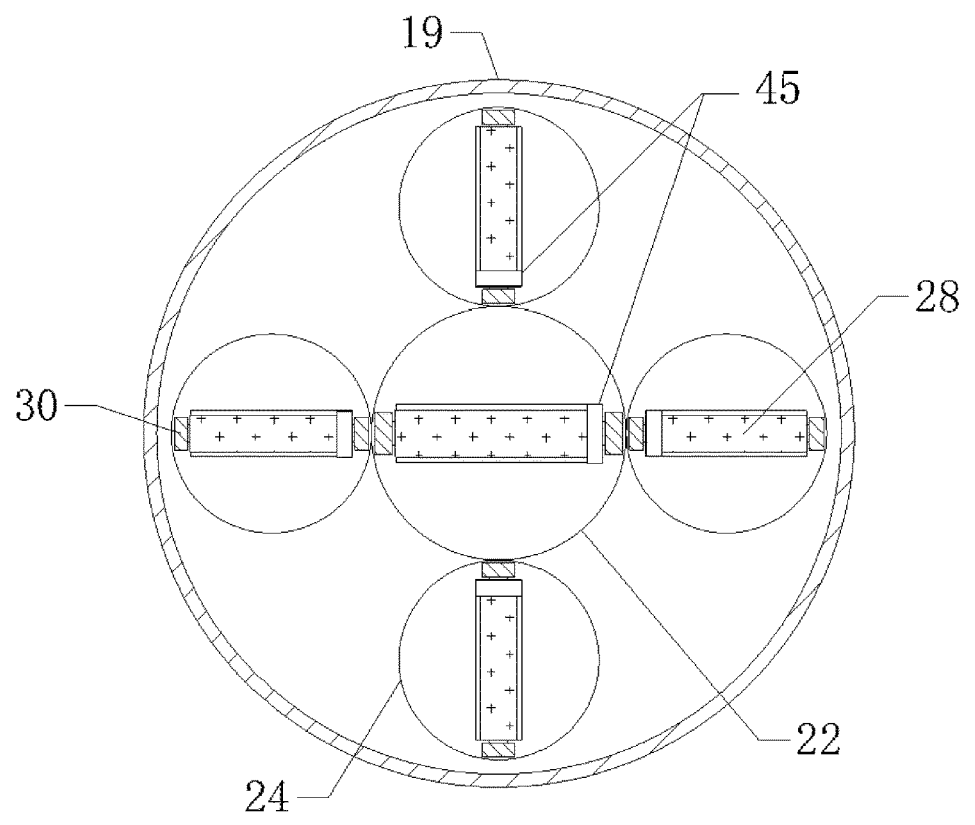

FIG. 5 illustrates a top view of structures inside the filter shell of the platinum catalyst recycling device shown in FIG. 1 according to the embodiment of the disclosure.

Figure 6:
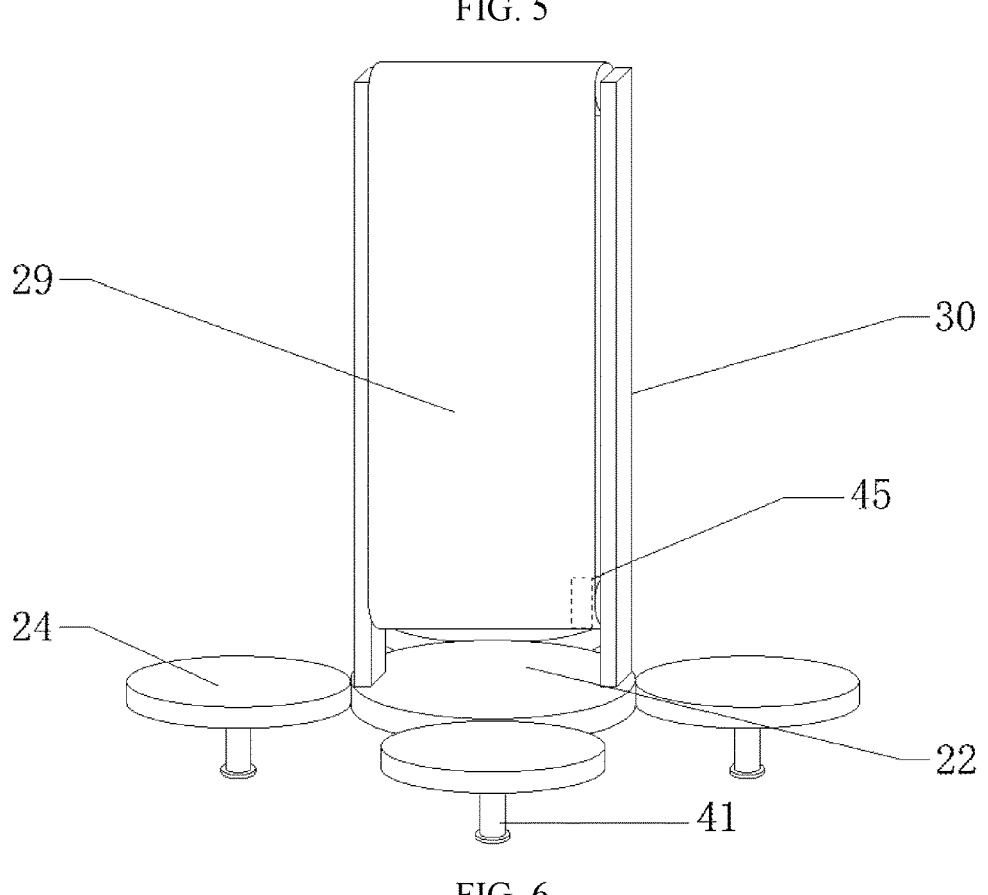

FIG. 6 illustrates a structural schematic diagram of a positional relationship among a center gear, side gears, a transmission belt, and fixing plates of the platinum catalyst recycling device shown in FIG. 1 according to the embodiment of the disclosure.

Figure 7:
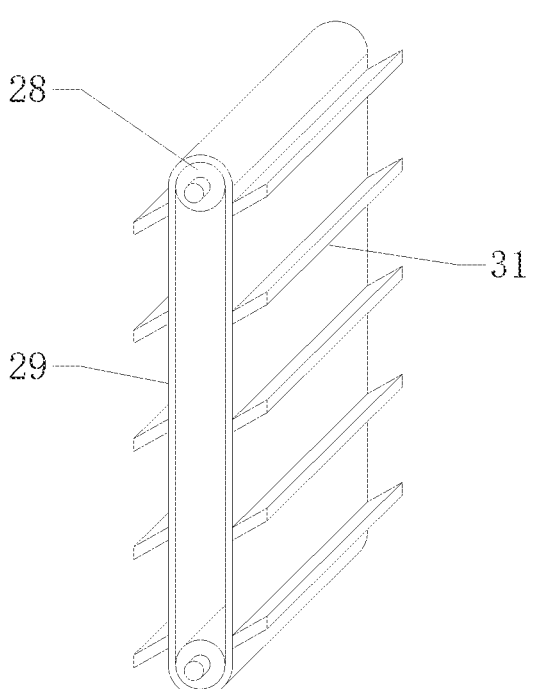

FIG. 7 illustrates a structural schematic diagram of a positional relationship among transmission shafts, a transmission belt, and flipping plates of the platinum catalyst recycling device shown in FIG. 1 according to the embodiment of the disclosure.

Figure 8:
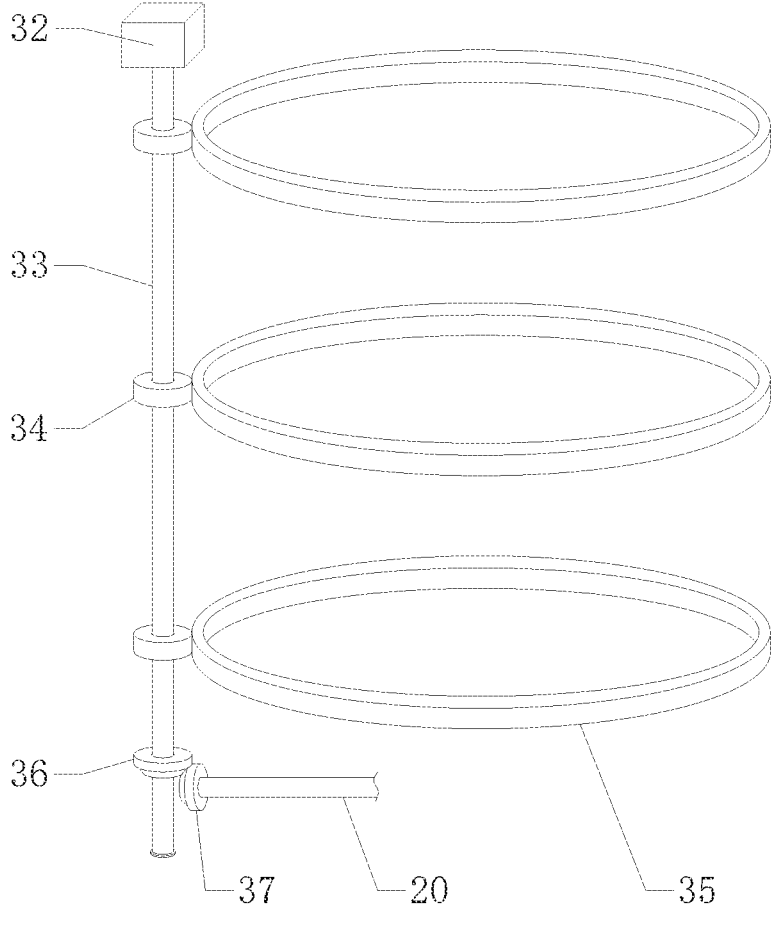

FIG. 8 illustrates a structural schematic diagram of a positional relationship among a linkage motor, an installation shaft, driving gears, driven gears, a first bevel gear, a second bevel gear, and a stirring shaft of the platinum catalyst recycling device shown in FIG. 1 according to the embodiment of the disclosure.

Figure 2:
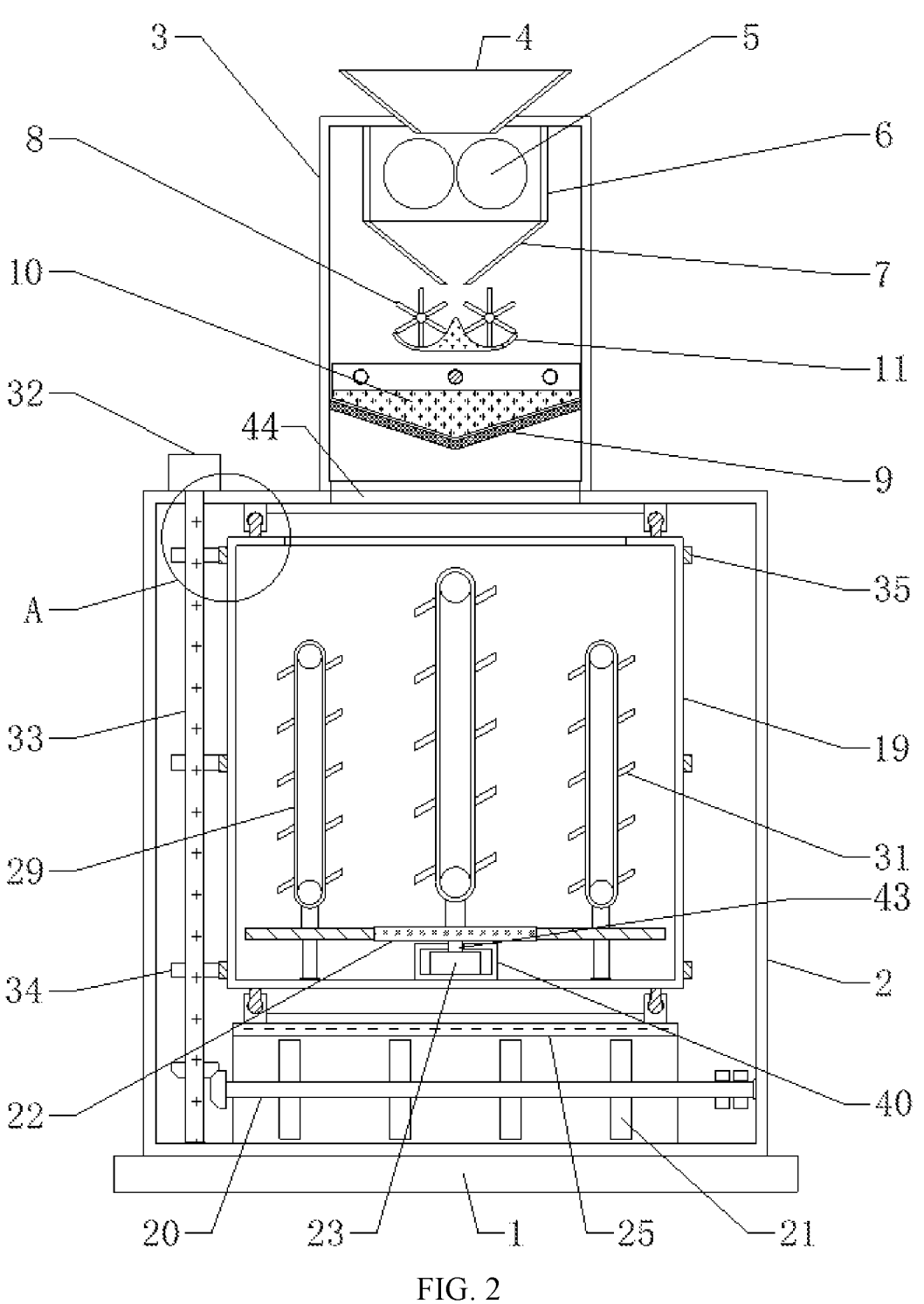
FIG. 2 illustrates another structural schematic diagram of the platinum catalyst recycling device shown in FIG. 1 according to the embodiment of the disclosure.
Figure 9:
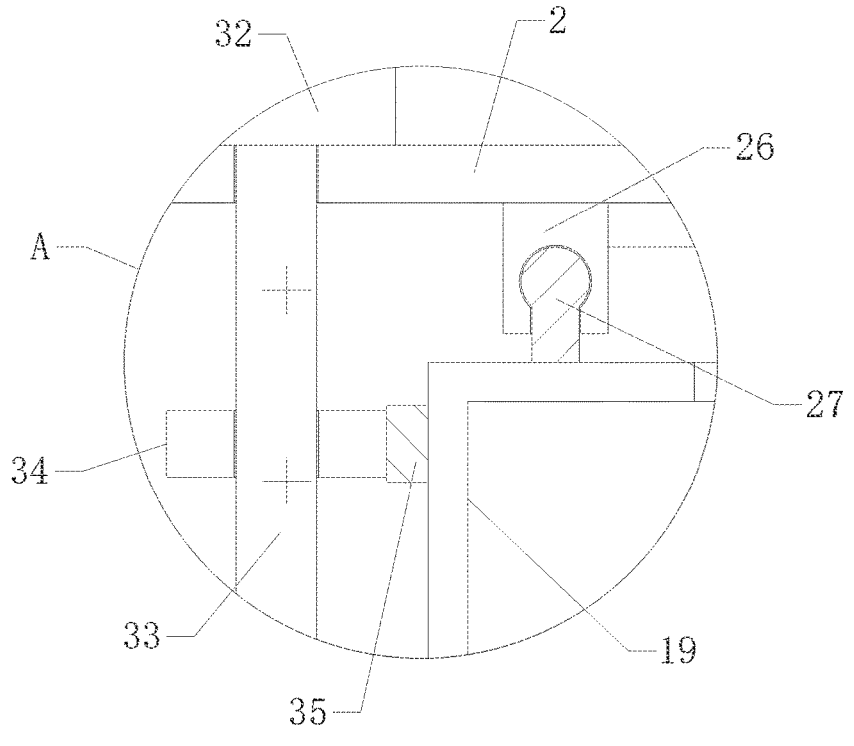

FIG. 9 illustrates an enlarged structural schematic diagram of the portion A shown in FIG. 2.

Figure 10:
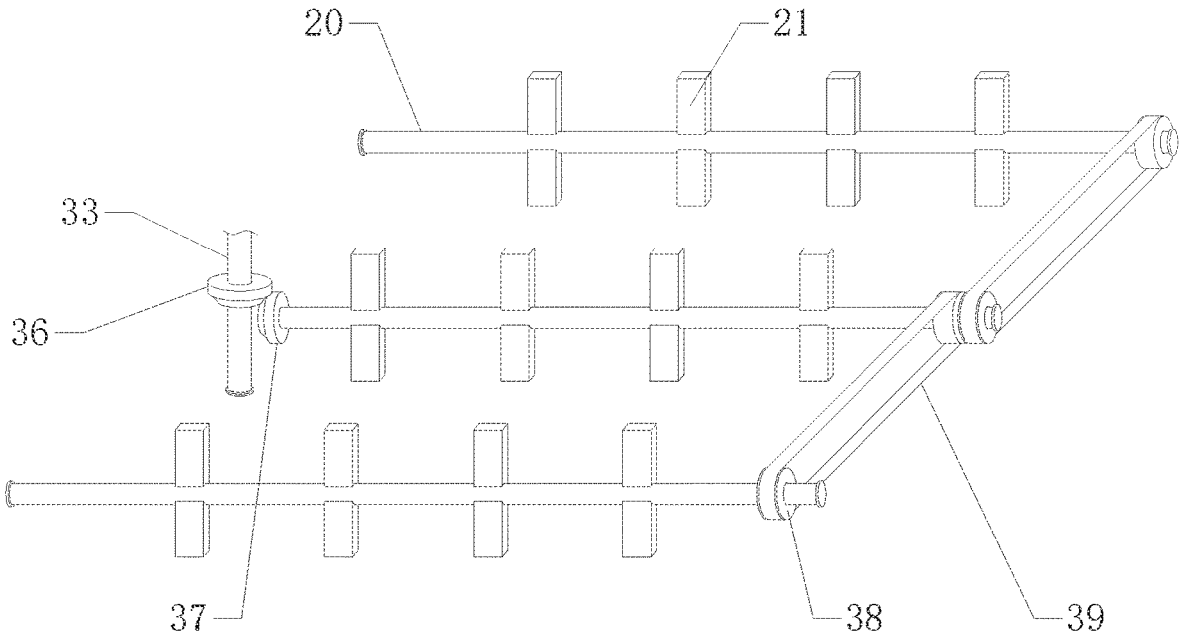

FIG. 10 illustrates a structural schematic diagram of a positional relationship among the first bevel gear, the second bevel gear, transmission chain wheels, transmission chains, stirring shafts, and stirring blades of the platinum catalyst recycling device shown in FIG. 1 according to the embodiment of the disclosure.

DESCRIPTION OF REFERENCE NUMERALS

1—support base; 2—recycling housing; 3—crushing housing; 4—feed tube; 5—crushing roller assembly; 6—crushing chamber; 7—guide plate; 8—uniform plate; 9—filter plate; 10—anti-blocking push plate; 11—dispersion plate; 12—uniform shaft; 13—threaded shaft; 14—slide plate; 15—limit column; 16—driving motor; 17—installation housing; 18—rotation gear; 19—filter housing; 20—stirring shaft; 21—stirring blade; 22—center gear; 23—rotation motor; 24—side gear; 25—support frame; 26—anti-deviation housing; 27—circular rail; 28—transmission shaft; 29—transmission belt; 30—fixing plate; 31—flipping plate; 32—linkage motor; 33—installation shaft; 34—driving gear; 35—driven gear; 36—first bevel gear; 37—second bevel gear; 38—transmission chain wheel; 39—transmission chain; 40—protective housing; 41—rotation shaft; 42—feed port; 43—rotation hole; 44—communication port; 45—transmission motor.

DETAILED DESCRIPTION OF EMBODIMENTS

In order to make the purposes, features, and advantages of the disclosure clearer and more understandable, the technical solutions in the embodiments of the disclosure will be clearly and completely described below in conjunction with drawings in the embodiments of the disclosure. Apparently, the embodiments described below are only a part of the embodiments in the disclosure, not all of them. Based on the embodiments in the disclosure, all other embodiments obtained by those of ordinary skill in the art without creative work are within the scope of the disclosure.

The technical solutions of the disclosure are further described below with reference to the drawings and specific embodiments.

In the description of the disclosure, it should be understood that the orientations or positional relationships indicated by terms "upper", "lower", "top", "bottom", "inner", "outer", and the like are based on the orientations or positional relationships shown in the drawings, the terms are merely for convenience of description of the disclosure and simplification of description. It is not intended to indicate or imply that the devices or elements referred to must have a particular orientation, be constructed and operated in a particular orientation, and therefore should not be considered as a limitation of the disclosure.

Referring to FIG. 1 and FIG. 2, a platinum catalyst recycling device with multiple filtration structures is provided. The platinum catalyst recycling device includes:

a support base 1, a recycling housing 2, fixedly connected to a top of the support base 1;

a crushing housing 3, fixedly connected to a top surface of the recycling housing 2; a feed port 42 is defined on a top surface of the crushing housing 3;

a feed tube 4, installed at the feed port 42 of the crushing housing 3;

a crushing roller assembly 5, installed in an inner cavity of the crushing housing 3;

a crushing chamber 6, fixedly connected to a sidewall of the inner cavity of the crushing housing 3; the crushing roller assembly 5 is disposed in an inner cavity of the crushing chamber 6;

a guide plate 7, fixedly connected to a bottom of the crushing chamber 6;

uniform plates 8, disposed below the guide plate 7;

a dispersion assembly, connected to the uniform plates 8;

a filter plate 9, disposed below the uniform plates 8;

an anti-blocking push plate 10, disposed on the filter plate 9;

an anti-blocking assembly, connected to the anti-blocking push plate 10; and a driving mechanism, connected between the dispersion assembly and the anti-blocking assembly through.

When platinum catalyst waste needs to be recycled, large pieces of platinum catalyst waste are thrown into the crushing housing 3 through the feed tube 4, and then the large pieces of platinum catalyst waste are crushed by the crushing roller assembly 5, and the crushed platinum catalyst waste can be dispersed through the uniform plate 8 and the dispersion assembly, so that the crushed platinum catalyst waste can be sequentially and uniformly dropped onto the filter plate 9. The filter plate 9 is configured for filtering the platinum catalyst waste to avoid the platinum catalyst waste with a large difference of particle sizes entering the recycling housing 2, and the anti-blocking assembly is configured for moving the anti-blocking push plate 10 during filtering. The anti-blocking push plate 10 is configured for pushing the platinum catalyst waste with large particle sizes to two sides for collection, so as to prevent the blocking of the filter plate 9 from affecting the use. The collected platinum catalyst waste with large particle sizes can be added to the crushing roller assembly 5 again for crushing, and the platinum catalyst waste filtered by the filter plate 9 falls into the recycling housing 2 for extraction and recycling.

Based on the above technical solutions, the filter plate 9 can be configured to filter the crushed platinum catalyst waste, so that pieces of the crushed platinum catalyst waste dissolved and recycled in the recycling housing 2 have a similar size. This solves the problem of different solubilities caused by the pieces of the crushed platinum catalyst waste with a large difference in size entering the platinum recycling solution at the same time, and therefore time for extracting platinum is the same in each platinum extraction process. In addition, during filtration, uniform plates 8 can be configured to sequentially and uniformly drop the crushed platinum catalyst waste onto the filter plate 9, so as to prevent the accumulation of the crushed platinum catalyst waste and improve the filtration efficiency. At the same time, the anti-blocking push plate 10 is configured to push the crushed platinum catalyst waste with large sizes to both sides for collection, so as to avoid blocking the filter plate 9 and affecting filtration efficiency. The rotation motor 23 is configured to drive the rotation of the filter housing 19. A center gear 22 and side gears 24 are configured to drive flipping assemblies to rotate, and the center gear 22 and the side gears 24 are rotated in reverse directions. At this time, the transmission belt 29 can be configured to drive flipping plates 31 to move, which can allow the crushed platinum catalyst waste to move from bottom to top, so as to solve the problem of low dissolution efficiency caused by a single stirring direction. The flipping plates 31 can fully make the crushed platinum catalyst waste contact with the platinum recycling solution, so as to improve the extraction efficiency of platinum. At the same time, the rotation motor 23 is configured to drive the stirring blades 21 to rotate, which can prevent the accumulation of the crushed platinum catalyst waste at a bottom of the recycling housing 2 and improve the dissolution efficiency of platinum catalyst waste. The driving mechanism is configured to provide a driving force for the rotation of uniform shafts 12 and the rotation of the threaded column 13 at the same time. The linkage mechanism is configured to provide a driving force for the rotation of the filter housing 19 and the rotation of the stirring shafts 20 at the same time, so as to reduce the number of power sources, reduce the operating cost of the recycling device, and reduce energy consumption, which is more environmentally friendly. The entire workflow of the platinum catalyst recycling device filters the platinum catalyst waste for multiple times, so as to achieve the purpose of filtering for multiple times.

Figure 3:
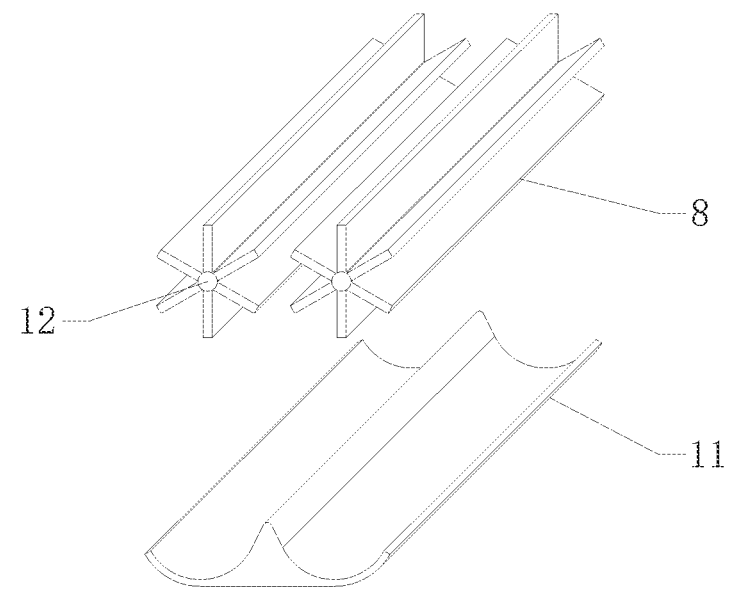
FIG. 3 illustrates an exploded view of uniform plates, a dispersion plate, and uniform shafts of the platinum catalyst recycling device shown in FIG. 1 according to the embodiment of the disclosure.

In an embodiment, as shown in FIG. 3, the dispersion assembly includes a dispersion plate 11 and two uniform shafts 12. The dispersion plate 11 is fixedly connected to the sidewall of the inner cavity of the crushing housing 3. The two uniform shafts 12 are symmetrically distributed, and the two uniform shafts 12 are disposed above the dispersion plate 11. Surfaces of the two uniform shafts 12 are fixedly connected to the uniform plates 8, and the uniform plates (8) connected to each of the two uniform shafts (12) are distributed in a circular array. In order to prevent the crushed platinum catalyst waste from being accumulated and falling onto the filter plate 9, the uniform plates 8 are disposed below the crushing roller assembly 5. After the platinum catalyst waste is crushed by the crushing roller assembly 5, the crushed platinum catalyst waste falls onto the uniform plates 8 and the dispersion plate 11 through the guide plate 7. At the same time, the driving motor 16 drives the uniform shafts 12 to rotate, so as to drive the uniform plates 8 to rotate. When the uniform plates 8 rotate, the platinum catalyst waste can be dispersed, so that the platinum catalyst waste sequentially and uniformly falls onto the filter plate 9 for filtration.

Figure 4:
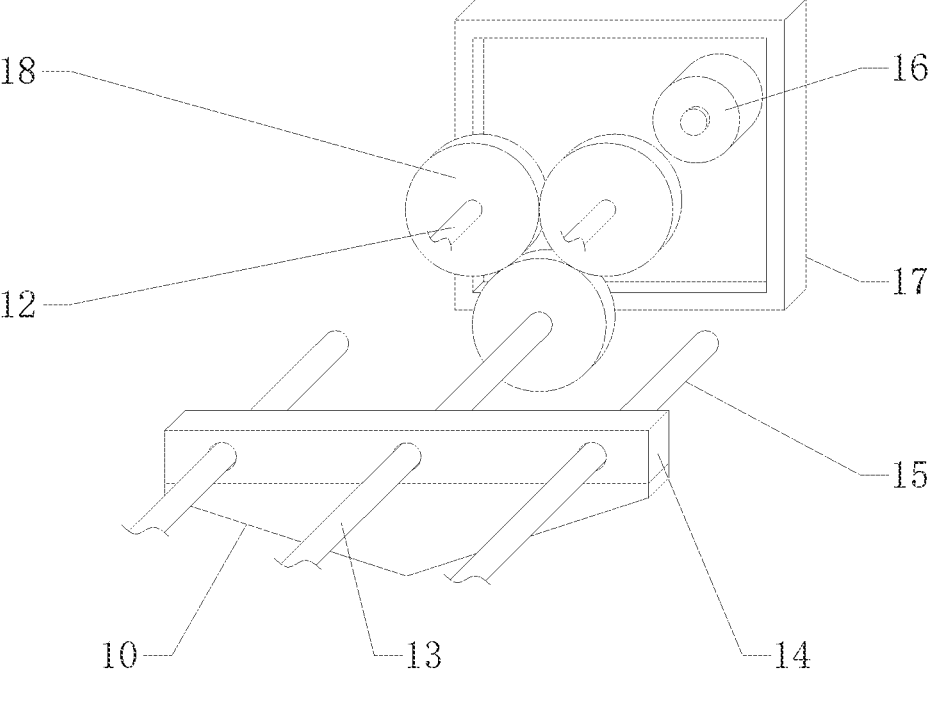
FIG. 4 illustrates an exploded view of a driving motor, an installation housing, rotation gears, uniform shafts, a threaded shaft, a slide plate, limit columns, and an anti-

Specifically, as shown in FIG. 2 and FIG. 4, the anti-blocking assembly includes a threaded column 13, a slide plate 14, and two limit columns 15. An end of the threaded column 13 is rotatably connected to the sidewall of the inner cavity of the crushing housing 3. The two limit columns 15 are symmetrically distributed relative to the threaded column, and the two limit columns 15 are fixedly connected to the sidewall of the inner cavity of the crushing housing 3. The limit columns 15 are configured to limit the movement of the slide plate 14. The slide plate 14 is threaded with the threaded column 13, and the slide plate 14 is slidably connected to surfaces of the limit columns 15. A bottom of the threaded column 13 is fixedly connected to a top of the anti-blocking push plate 10. When the platinum catalyst waste is filtered by the filter plate 9, the driving motor 16 drives the threaded column 13 to rotate, the rotation of the threaded column 13 makes the slide plate 14 to move along the limit columns 15, so as to drive the anti-blocking push plate 10 to move. At the same time, the anti-blocking push plate 10 can push the platinum catalyst waste filtered out by the filter plate 9 to both sides for collection.

In an embodiment, as shown in FIG. 4, the platinum catalyst recycling device further includes: an installation housing 17 fixedly connected to an outside of the crushing housing 3. The driving mechanism includes: a driving motor 16 and three rotation gears 18. The driving motor 16 is fixedly connected to a sidewall of an inner cavity of the installation housing 17, and the three rotation gears 18 are distributed in a triangle and disposed in the inner cavity of the installation housing 17. Adjacent two of the three rotation gears 18 are meshed, and one of the three rotation gears 18 is fixedly connected to an output end of the driving motor 16; a side of one of the three rotation gears 18 is fixedly connected to the threaded column 13 while other two of the three rotation gears 18 are symmetrically distributed, and the rotation gear 18 fixedly connected to the threaded column 13 is located below the other two rotation gears 18. Sides of the other two rotation gears 18 are fixedly connected to ends of the uniform shafts 12, respectively.

Based on the above technical solutions, when in use, the driving motor 16 drives the corresponding rotation gear 18 to rotate, thereby driving the other two rotation gears 18 to rotate. When the rotation gears 18 rotate, they can respectively drive the uniform shafts 12 and the threaded column 13 to rotate, that is, a single driving motor 16 can provide a driving force for the uniform shafts 12 and the threaded column 13.

Specifically, as shown in FIG. 2, each of the feed tube 4 and the guide plate 7 has a V-shaped structure. A lower end of the feed tube 4 extends to the inner cavity of the crushing chamber 6 through the feed port 42; and a communication port 44 is opened at a contact position between the recycling housing 2 and the crushing housing 3, and the communication port 44 is configured to connect the recycling housing 2 and the crushing housing 3.

In an embodiment, as shown in FIG. 2 and FIG. 5, the platinum catalyst recycling device further includes a filter assembly, a support assembly, a linkage mechanism and flipping assemblies. The filter assembly includes: a filter housing 19, stirring shafts 20, multiple stirring blades 21, a center gear 22, a rotation motor 23, and side gears 24. The filter housing 19 is disposed in an inner cavity of the recycling housing 2, and the filter housing 19 is connected to an inner wall of the recycling housing 2 through the support assembly. The stirring shafts 20 are disposed below the filter housing 19, and surfaces of the stirring shafts 20 are fixedly connected with the multiple stirring blades 21. The filter housing 19 is connected to the multiple stirring blades 21 through the linkage mechanism. The center gear 22 is disposed in an inner cavity of the filter housing 19, and the center gear 22 is fixedly connected to an output end of the rotation motor 23. A side of the center gear 22 is meshed with the side gears 24, and the flipping assemblies are disposed on the center gear 22 and the side gears 24 respectively.

Based on the above technical solutions, the platinum catalyst waste enters the filter housing 19 after being crushed and filtered, at the same time, the rotation motor 23 drives the center gear 22 to rotate, so as to drive the side gears 24 to rotate, and can drive the flipping assemblies to rotate at the moment, so that the platinum catalyst waste in the filter housing 19 can be stirred. When the flipping assemblies are rotated, the transmission shafts 28 can drive the transmission belt 29 to rotate, and the rotation of the transmission belt 29 can drive the flipping plates 31 to rotate, so as to flip the platinum catalyst waste from bottom to top. Therefore, the platinum catalyst waste in the platinum recycling solution in the filter housing 19 can be stirred horizontally and vertically, and the platinum recycling solution is mixed with the platinum catalyst waste more uniformly.

In an embodiment, as shown in FIG. 2 and FIG. 9, the support assembly includes: a support frame 25, anti-deviation housings 26 and a circular rail 27. A bottom of the inner cavity of the recycling housing 2 is fixedly connected to the support frame 25. A section of the support frame 25 is inverted-U-shaped. A top surface of the support frame 25 and a top of the inner cavity of the recycling housing 2 are fixedly connected to the anti-deviation housings 26 distributed in a circular array; an inner wall of each of the anti-deviation housings 26 is slidably connected to the circular rail 27, and the circular rail 27 is fixedly connected to an outside of the recycling housing 2. In order to make the filter housing 19 more stable during rotation, the rotation of the filter housing 19 can drive the circular rail, so that the circular rail 27 can rotate in the anti-deviation housings 26 to support and limit the rotation of the filter housing 19.

In an embodiment, as shown in FIG. 5, FIG. 6, and FIG. 7, each of the flipping assemblies includes: two transmission shafts 28, a transmission belt 29 and fixing plates 30. The transmission belt 29 is wrapped on the two transmission shafts 28, and the two transmission shafts 28 are connected through the transmission belt 29. An end surface of one of the two transmission shafts 28 is fixedly connected to a transmission motor 45, and two ends of each of the two transmission shafts 28 are respectively provided with two of the fixing plates 30. A top of the center gear 22 is fixedly connected to two symmetrically distributed fixing plates 30 of the fixing plates 30. A top of each of the side gears 24 are fixed connected to two symmetrically distributed fixing plates 30 of the fixing plates 30. When the flipping assemblies are rotated, the transmission shafts 28 can drive the transmission belt 29 to rotate, and the rotation of the transmission belt 29 can drive the flipping plates 31 to rotate, so as to flip the platinum catalyst waste from bottom to top.

In an embodiment, as shown in FIG. 2 and FIG. 10, the linkage mechanism includes: a linkage motor 32, an installation shaft 33, driving gears 34, driven gears 35, a first bevel gear 36, a second bevel gear 37, transmission chain wheels 38 and transmission chains 39. The linkage motor 32 is fixed connected to a top of the recycling housing 2, and an output end of the linkage motor 32 is fixedly connected to the installation shaft 33. A surface of the installation shaft 33 is fixedly connected to the driving gears 34. Sides of the driving gears 34 are meshed with the driven gears 35 respectively, and the driven gears 35 are fixedly connected to an outside of the filter housing 19. The inner cavity of the recycling housing 2 is provided with the stirring shafts 20, the stirring shafts 20 are rotatably connected to the inner wall of the recycling housing 2, and an end of a middle one of the stirring shafts 20 is fixedly connected to the first bevel gear 36. A side of the first bevel gear 36 is meshed with the second bevel gear 37, and the second bevel gear 37 is fixedly connected to the middle one of the stirring shafts 20. An end of each of the stirring shafts 20 is fixedly connected to a corresponding one of the transmission chain wheels 38. Adjacent two of the transmission chain wheels 38 are connected through a corresponding one of the transmission chains 39.

Based on the above technical solutions, when the platinum is recycled, the linkage motor 32 drives the installation shaft 33 to rotate, so as to drive the driving gears 34 to rotate, and further drive the driven gears 35 to rotate. When the driven gears 35 rotate, the filter housing 19 can be rotated by the driven gears 35, and a rotation direction of the filter housing 19 is opposite to that of the center gear 22. A contact area between the platinum catalyst waste and the platinum recycling solution is further increased, and the recycling efficiency of platinum is improved. When the installation shaft 33 is rotated, the first bevel gear 36 can be driven by the installation shaft 33, so that the second bevel gear 37 is driven to rotate, and at the same time, the corresponding stirring shaft 20 is driven to rotate. When the corresponding stirring shaft 20 is rotated, the corresponding transmission chain wheel 38 is driven, thereby driving the transmission chains 39 to rotate, and then driving the other transmission chain wheels 38 to rotate, so that the other stirring shafts 20 can be driven to rotate. The rotation of the stirring shafts 20 can drive the stirring blades 21 to rotate, so as to stir the platinum recycling solution and prevent the platinum recycling solution from precipitating and affecting the use effect.

Specifically, as shown in FIG. 8, FIG. 9, and FIG. 10, the platinum catalyst recycling device further includes: a protective housing 40 and rotation shafts 41. The rotation motor 23 is disposed in an inner cavity of the protective housing 40. The protective housing 40 is fixedly connected to a bottom of the inner cavity of the filter housing 19, a top surface of the protective housing 40 is defined on a rotation hole 43, and an output end of the rotation motor 23 penetrates through the rotation hole 43 and extends to the inner cavity of the filter housing 19. The side of the center gear 22 is meshed with the side gears 24 distributed in a circular array, bottoms of the side gears 24 are fixedly connected to the rotation shafts 41, respectively; and ends of the rotation shafts 41 are rotatably connected to the bottom of the inner cavity of the filter housing 19. The rotation shaft 41 can support the side gears 24, so that side gears 24 are rotated smoothly and stably.

It will be apparent to those skilled in the art that the disclosure is not limited to the details of the above-described exemplary embodiments, and the disclosure can be implemented in other specific forms without departing from the spirit or essential features of the disclosure. Therefore, the embodiments should be considered as exemplary and non-restrictive, the scope of the disclosure is defined by the appended claims rather than by the foregoing description. Therefore, it is intended to encompass all changes within the meaning and scope of the equivalents of the claims within the disclosure. Any reference signs in the claims should not be considered as limitations to the claims involved.

The above embodiments are only used to illustrate the technical solution of the disclosure and not to limit it. Although the disclosure has been described in detail with reference to the above embodiments, ordinary technical personnel in the art should understand that they can still modify the technical solutions recorded in the above embodiments, or equivalently replace some of the technical features therein. However, these modifications or replacements do not make the essence of the corresponding technical solutions deviate from the spirit and scope of the technical solutions in the various embodiments of the disclosure.

What is claimed is:

1. A platinum catalyst recycling device, comprising:
a support base (1),
a recycling housing (2), fixedly connected to a top of the support base (1);
a crushing housing (3), fixedly connected to a top surface of the recycling housing (2); wherein a feed port (42) is defined on a top surface of the crushing housing (3);
a feed tube (4), installed at the feed port (42) of the crushing housing (3);
a crushing roller assembly (5), installed in an inner cavity of the crushing housing (3);
a crushing chamber (6), fixedly connected to a sidewall of the inner cavity of the crushing housing (3); wherein the crushing roller assembly (5) is disposed in an inner cavity of the crushing chamber (6);
a guide plate (7), fixedly connected to a bottom of the crushing chamber (6);
uniform plates (8), disposed below the guide plate (7);
a dispersion assembly, connected to the uniform plates (8);
a filter plate (9), disposed below the uniform plates (8);
an anti-blocking push plate (10), disposed on the filter plate (9);
an anti-blocking assembly, connected to the anti-blocking push plate (10); and
a driving mechanism, connected between the dispersion assembly and the anti-blocking assembly.

2. The platinum catalyst recycling device as claimed in claim 1, wherein the dispersion assembly comprises: a dispersion plate (11) and two uniform shafts (12); the dispersion plate (11) is fixedly connected to the sidewall of the inner cavity of the crushing housing (3); the two uniform shafts (12) are symmetrically distributed, and disposed above the dispersion plate (11); and surfaces of the two uniform shafts (12) are fixedly connected to the uniform plates (8), and the uniform plates (8) connected to each of the two uniform shafts (12) are distributed in a circular array.

3. The platinum catalyst recycling device as claimed in claim 1, wherein the anti-blocking assembly comprises: a threaded column (13), a slide plate (14) and two limit columns (15); an end of the threaded column (13) is rotatably connected to the sidewall of the inner cavity of the crushing housing (3); the two limit columns (15) are symmetrically distributed relative to the threaded column (13), and the two limit columns (15) are fixedly connected to the sidewall of the inner cavity of the crushing housing (3); the slide plate (14) is threaded with the threaded column (13), and the slide plate (14) is slidably connected to surfaces of the limit columns (15).

4. The platinum catalyst recycling device as claimed in claim 1, wherein the platinum catalyst recycling device further comprises: an installation housing (17) fixedly connected to an outside of the crushing housing (3); the driving mechanism comprises: a driving motor (16) and three rotation gears (18), the driving motor (16) is fixedly connected to a sidewall of an inner cavity of the installation housing (17), and the three rotation gears (18) are distributed in a triangle and disposed in the inner cavity of the installation housing (17); an adjacent two of the three rotation gears (18) are meshed, and one of the three rotation gears (18) is fixedly connected to an output end of the driving motor (16); a side of one of the three rotation gears (18) is fixedly connected to the threaded column (13) while another two of the three rotation gears (18) are symmetrically distributed relative to the one of the three rotation gears, and the rotation gear (18) fixedly connected to the threaded column (13) is located below the other two rotation gears (18); and sides of the other two rotation gears (18) are fixedly connected to ends of the uniform shafts (12), respectively.

5. The platinum catalyst recycling device as claimed in claim 1, wherein each of the feed tube (4) and the guide plate (7) has a V-shaped structure; a lower end of the feed tube (4) extends to the inner cavity of the crushing chamber (6) through the feed port (42); and a communication port (44) is opened at a contact position between the recycling housing (2) and the crushing housing (3), and the communication port (44) is configured to connect the recycling housing (2) and the crushing housing (3).

6. The platinum catalyst recycling device as claimed in claim 1, further comprising: a filter assembly, a support assembly, a linkage mechanism and flipping assemblies; wherein the filter assembly comprises: a filter housing (19), stirring shafts (20), a plurality of stirring blades (21), a center gear (22), a rotation motor (23), and side gears (24); the filter housing (19) is disposed in an inner cavity of the recycling housing (2), and the filter housing (19) is connected to an inner wall of the recycling housing (2) through the support assembly; the stirring shafts (20) are disposed below the filter housing (19), and surfaces of the stirring shafts (20) are fixedly connected with the plurality of stirring blades (21); the filter housing (19) is connected to the plurality of stirring blades (21) through the linkage mechanism; the center gear (22) is disposed in an inner cavity of the filter housing (19), and the center gear (22) is fixedly connected to an output end of the rotation motor (23); a side of the center gear (22) is meshed with the side gears (24), and the flipping assemblies are disposed on the center gear (22) and the side gears (24) respectively.

7. The platinum catalyst recycling device as claimed in claim 6, wherein the support assembly comprises: a support frame (25), anti-deviation housings (26) and a circular rail (27); a bottom of the inner cavity of the recycling housing (2) is fixedly connected to the support frame (25); a section of the support frame (25) is inverted-U-shaped; a top surface of the support frame (25) and a top of the inner cavity of the recycling housing (2) are fixedly connected to the anti-deviation housings (26) distributed in a circular array; an inner wall of each of the anti-deviation housings (26) is slidably connected to the circular rail (27), and the circular rail (27) is fixedly connected to an outside of the recycling housing (2).

8. The platinum catalyst recycling device as claimed in claim 6, wherein each of the flipping assemblies comprises: two transmission shafts (28), a transmission belt (29) and fixing plates (30); the transmission belt (29) is wrapped on the two transmission shafts (28), and the two transmission shafts (28) are connected through the transmission belt (29); an end surface of one of the two transmission shafts (28) is fixedly connected to a transmission motor (45), and two ends of each of the two transmission shafts (28) are respectively provided with two of the fixing plates (30); a top of the center gear (22) is fixedly connected to two symmetrically distributed fixing plates (30) of the fixing plates (30); and a top of each of the side gears (24) are fixedly connected to two symmetrically distributed fixing plates (30) of the fixing plates (30).

9. The platinum catalyst recycling device as claimed in claim 6, wherein the linkage mechanism comprises: a linkage motor (32), an installation shaft (33), driving gears (34), driven gears (35), a first bevel gear (36), a second bevel gear (37), transmission chain wheels (38) and transmission chains (39); the linkage motor (32) is fixedly connected to a top of the recycling housing (2), and an output end of the linkage motor (32) is fixedly connected to the installation shaft (33); a surface of the installation shaft (33) is fixedly connected to the driving gears (34); sides of the driving gears (34) are meshed with the driven gears (35) respectively, and the driven gears (35) are fixedly connected to an outside of the filter housing (19); the inner cavity of the recycling housing (2) is provided with the stirring shafts (20), the stirring shafts (20) are rotatably connected to the inner wall of the recycling housing (2), and an end of a middle one of the stirring shafts (20) is fixedly connected to the first bevel gear (36); a side of the first bevel gear (36) is meshed with the second bevel gear (37), and the second bevel gear (37) is fixedly connected to the middle one of the stirring shafts (20); an end of each of the stirring shafts (20) is fixedly connected to a corresponding one of the transmission chain wheels (38); and an adjacent two of the transmission chain wheels (38) are connected through a corresponding one of the transmission chains (39).

10. The platinum catalyst recycling device as claimed in claim 6, wherein the platinum catalyst recycling device further comprises: a protective housing (40) and rotation shafts (41); the rotation motor (23) is disposed in an inner cavity of the protective housing (40), the protective housing (40) is fixedly connected to a bottom of the inner cavity of the filter housing (19), a top surface of the protective housing (40) includes a rotation hole (43), and an output end of the rotation motor (23) penetrates through the rotation hole (43) and extends to the inner cavity of the filter housing (19); the side of the center gear (22) is meshed with the side gears (24) distributed in a circular array, bottoms of the side gears (24) are fixedly connected to the rotation shafts (41), respectively; and ends of the rotation shafts (41) are rotatably connected to the bottom of the inner cavity of the filter housing (19).

* * * * *